(12) United States Patent
Gollier et al.

(10) Patent No.: US 10,921,607 B2
(45) Date of Patent: Feb. 16, 2021

(54) ENGINEERED SURFACE TO REDUCE VISIBILITY OF PIXEL SEPARATION IN DISPLAYS

(71) Applicant: Corning Incorporated, Corning, NY (US)

(72) Inventors: Jacques Gollier, Bellevue, WA (US); James Andrew West, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 237 days.

(21) Appl. No.: 16/074,977

(22) PCT Filed: Feb. 7, 2017

(86) PCT No.: PCT/US2017/016780
§ 371 (c)(1),
(2) Date: Aug. 2, 2018

(87) PCT Pub. No.: WO2017/139245
PCT Pub. Date: Aug. 17, 2017

(65) Prior Publication Data
US 2019/0041658 A1    Feb. 7, 2019

Related U.S. Application Data

(60) Provisional application No. 62/292,571, filed on Feb. 8, 2016.

(51) Int. Cl.
| | | |
|---|---|---|
| *G02B 27/42* | (2006.01) | |
| *G02B 27/10* | (2006.01) | |
| *G02B 27/01* | (2006.01) | |

(52) U.S. Cl.
CPC ..... *G02B 27/4205* (2013.01); *G02B 27/0172* (2013.01); *G02B 27/1066* (2013.01);
(Continued)

(58) Field of Classification Search
CPC .. G02B 27/0172; G02B 5/18; G02B 27/0081; G02B 5/1842; G02B 27/0101;
(Continued)

(56) References Cited

U.S. PATENT DOCUMENTS

| | | |
|---|---|---|
| 5,755,501 A | 5/1998 | Shinohara et al. |
| 6,310,728 B1 | 10/2001 | Okuyama et al. |

(Continued)

FOREIGN PATENT DOCUMENTS

| | | |
|---|---|---|
| TW | 456722 U | 9/2001 |
| WO | 2015191949 A1 | 12/2015 |

OTHER PUBLICATIONS

"From Screendoor, Fill Rate and Image Sharpness, How Does Panasonic's Smooth Screen Technology Really Work?"; 22 Pages; Downloaded Oct. 25, 2018; http://www.cine4home.de/Specials/PT4000SmoothScreen/ScreenSmooth.htm.
(Continued)

*Primary Examiner* — Collin X Beatty
*Assistant Examiner* — Grant A Gagnon

(57) ABSTRACT

A diffraction element can be employed in a surface display unit to provide diffraction peaks in a manner that reduces or eliminates a screen door effect that is prevalent in pixelated displays that does not have sufficient pixel density. The parameters of the diffraction element can be selected such that the diffraction peaks provide appearance of a larger pixel area than a corresponding physical pixel size. For example, first order diffraction peaks can be placed at a distance of about ⅓ of a nearest subpixel-to-sub-pixel distance. The surface display unit can be employed for any image display application to enhance image quality. For example, a virtual reality headset to remove the screen door effect.

19 Claims, 9 Drawing Sheets

(52) U.S. Cl.
CPC ..... *G02B 27/1086* (2013.01); *G02B 27/4272* (2013.01); *G02B 27/4277* (2013.01)

(58) Field of Classification Search
CPC .............................. G02B 5/1861; G02B 6/00; G02B 2027/0125; G02B 27/4205; G02B 2027/0178; G02B 2027/0118; G02B 27/017; G02B 5/32; G02B 2027/0123; G02B 2027/0174; G02B 27/0103; G02B 27/1086; G02B 6/0038; G02B 6/0076; G02B 5/1814; G02B 5/1819; G02B 6/34; G02B 17/004; G02B 2027/0112; G02B 2027/015; G02B 27/42; G02B 27/4272; G02B 27/44; G02B 5/30; G02B 6/0026; G02B 6/0035; G02B 6/005; G02B 13/18; G02B 17/006; G02B 17/0856; G02B 2027/0116; G02B 2027/0138; G02B 27/0093; G02B 27/01; G02B 27/144; G02B 30/27; G02B 5/1857; G02B 5/1866; G02B 6/0016; G02B 6/0018; G02B 6/0028; G02B 6/0033; G02B 6/0068; G02B 6/2848; G02B 6/4298; G02B 6/43; G02B 2027/011; G02B 2027/0127; G02B 2027/014; G02B 2027/0187; G02B 2027/0194; G02B 26/001; G02B 26/10; G02B 27/0176; G02B 27/1066; G02B 27/283; G02B 27/4211; G02B 27/425; G02B 3/0006; G02B 5/0221; G02B 5/0252; G02B 5/0263; G02B 5/0278; G02B 5/0284; G02B 5/0294; G02B 5/1828; G02B 5/1847; G02B 5/1885; G02B 6/0036; G02B 6/0053; G02B 6/0061; G02B 17/086; G02B 19/0028; G02B 19/0038; G02B 2005/1804; G02B 2027/0105; G02B 2027/012; G02B 2027/0121; G02B 2027/013; G02B 2027/0147; G02B 2027/0154; G02B 2027/0183; G02B 2027/0196; G02B 23/12; G02B 26/0833; G02B 27/0018; G02B 27/0025; G02B 27/0068; G02B 27/0075; G02B 27/0087; G02B 27/0149; G02B 27/0905; G02B 27/0944; G02B 27/0977; G02B 27/1006; G02B 27/104; G02B 27/1053; G02B 27/1073; G02B 27/1093; G02B 27/141; G02B 27/142; G02B 27/145; G02B 27/149; G02B 27/4227; G02B 27/4244; G02B 27/4277; G02B 27/48; G02B 27/60; G02B 30/00; G02B 30/23; G02B 30/24; G02B 30/25; G02B 30/26; G02B 30/40; G02B 3/0031; G02B 3/0037; G02B 3/12; G02B 5/02; G02B 5/0215; G02B 5/0268; G02B 5/0289; G02B 5/045; G02B 5/0808; G02B 5/09; G02B 5/1809; G02B 5/1823; G02B 5/1838; G02B 5/1876; G02B 5/285; G02B 5/3025; G02B 6/0015; G02B 6/0031; G02B 6/0051; G02B 6/0055; G02B 6/0058; G02B 6/006; G02B 6/0078; G02B 6/29328; G02B 6/29388; G02B 6/42

USPC ...................................................... 359/567
See application file for complete search history.

(56) References Cited

U.S. PATENT DOCUMENTS

| | | | |
|---|---|---|---|
| 7,365,721 B2 | 4/2008 | Tanaka et al. | |
| 10,353,214 B2 * | 7/2019 | Sitter | G02B 27/1093 |
| 2010/0177129 A1 | 7/2010 | Fredlund et al. | |
| 2012/0300307 A1 | 11/2012 | Borrelli et al. | |
| 2015/0248169 A1 | 9/2015 | Abovitz et al. | |

OTHER PUBLICATIONS

"Samsung's First AMOLED Quad HD Display Gets Analyzed: Further Improved Color Accuracy, Not That Green Any More"; Jul. 2014; 6 Pages; http://www.phonearena.com/news/Samsungs-first-AMOLED-Quad-HD-display-gets-analyzed-further-improved-color-accuracy-not-that-green-any-more_id58271.

Blaustein; "Do We Need 4K Resolution for Immersive VR?"; 6 Pages; (2013); http://www.gamasutra.com/blogs/IvanBlaustein/20131029/203543/Do_we_need_4K_resolution_for_immersive_VR.php?print=1.

Davies "Samsung's Not Giving Up on VR: Gear VR GS6 Hands-On"; 14 Pages; (2015) http://www.slashgear.com/samsungs-not-giving-up-on-vr-gear-vr-gs6-hands-on-05372228/.

MTBS3D; "Dealing With the Screen Door Effect"; http://www.mtbs3d.com/phpBB/viewtopic.php?f=140&t=17927; 12 Pages; Downloaded Oct. 24, 2018.

Prongue et al; "Optimized Kinoform Structures for Highly Efficient Fan-Out Elements"; Applied Optics 31 5706 (1992).

Sajadi et al; "Image Enhancement in Projectors Via Optical Pixel Shift and Overlay"; 10 Pages; Date Unknown; http://www.ics.uci.edu/~majumder/docs/iccp13.pdf.

International Search Report and Written Opinion of the International Searching Authority; PCT/US2017/016780; dated Apr. 12, 2017; 11 Pages; European Patent Office.

English Translation of TW106104010 Office Action dated May 28, 2020; 4 Pages; Taiwan Patent Office.

* cited by examiner

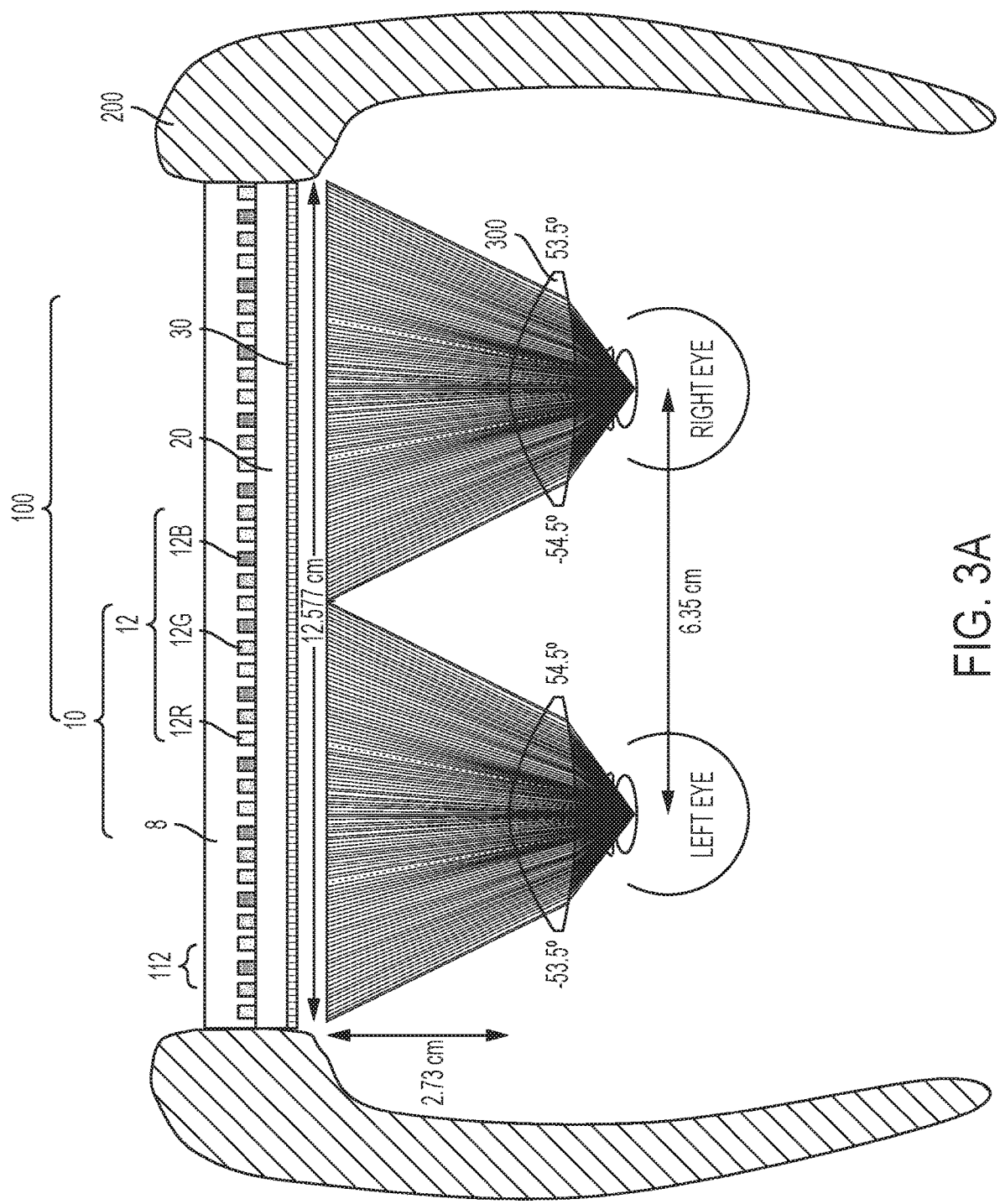

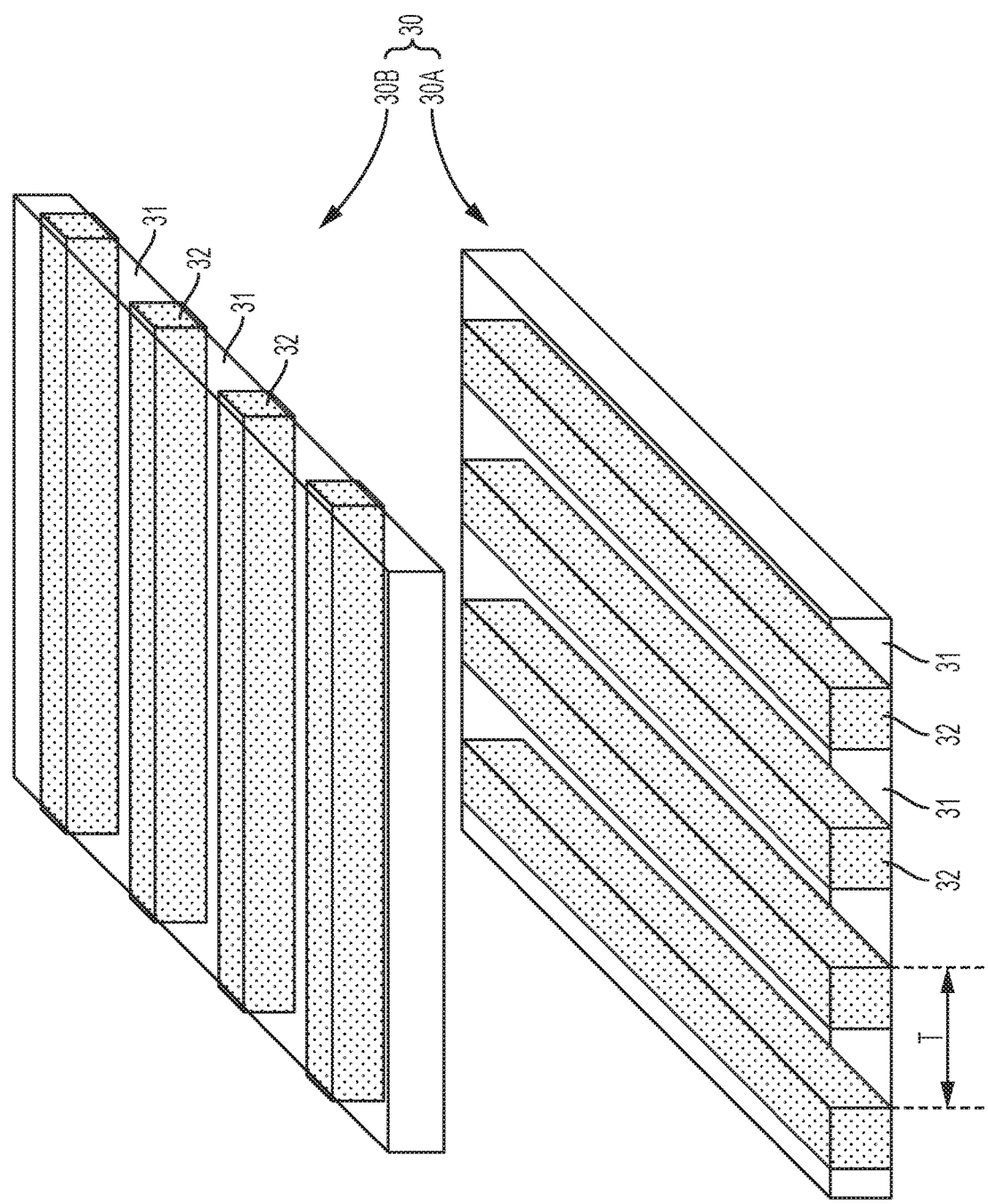

ENGINEERED SURFACE TO REDUCE VISIBILITY OF PIXEL SEPARATION IN DISPLAYS

CROSS-REFERENCE TO RELATED APPLICATIONS

This application claims the benefit of priority under 35 U.S.C. § 365 of International Patent Application Serial No. PCT/US17/16780 filed on Feb. 7, 2017, which claims priority to U.S. Provisional Application Ser. No. 62/292,571 filed on Feb. 8, 2016, the content of which is relied upon and incorporated herein by reference in its entirety.

FIELD

Background

The present disclosure relates generally to the field of image display devices and methods of manufacturing the same.

When possible, the density of pixels in displays is chosen such that the user cannot resolve individual pixels at distances at a typical use distance or beyond. For a handheld unit, a typical viewing distance may be about 30 cm, and thus, a handheld unit requires a screen with a very high pixel density. For example, iPhone 6 Plus from Apple employs 401 pixels per inch (ppi), and Galaxy S6 from Samsung employs 577 ppi. For a large TV, a typical viewing distance may be 2 about meters, and thus, would place much lower requirements on the pixel density. Typically, less than 100 ppi pixel density can be employed for a high definition television (HDTV) set. The rising popularity of virtual reality (VR) displays has led to a different type of viewing paradigm that has challenged even the ultra-high pixel densities of today's existing hand-held display technologies.

SUMMARY

A diffraction element can be employed to provide diffraction peaks between subpixels such that screen door effect in a display device can be mitigated. The diffraction peaks increase an apparent pixel illumination area without physically increasing the size of a subpixel.

According to an aspect of the present disclosure, a surface display unit is provided, which comprises a pixilated display device including a two-dimensional array of pixels; at least one transparent material layer located over the pixilated display device; and a diffraction element located over the at least one transparent material layer and configured to provide diffraction peaks for pixels within the pixilated display device. The diffraction element has an interface selected from a solid-to-ambient interface and an interface with a transparent glossy material layer at a front surface that is distal from the pixilated display device.

In one embodiment, the surface display unit can be a virtual reality headset, and the pixilated display device is a head mount display configured to provide a display image within a glare-free enclosure defined by the virtual reality headset and an operator of the virtual display headset.

In one embodiment, the surface display device can be formed by: providing a head set frame; providing an assembly of the pixilated display device, the at least one transparent material layer, and the diffraction element; and mounting the assembly to the head set frame.

According to another aspect of the present disclosure, a virtual reality headset is provided, which comprises: a head set frame; and an assembly of a pixilated display device, at least one transparent material layer, and a diffraction element. The assembly is mounted on the head set frame to provide a glare-free enclosure defined by the virtual reality headset and an operator of the virtual display headset. The pixilated display device includes a two-dimensional array of pixels. The at least one transparent material layer is located between the pixilated display device and the diffraction element. The diffraction element is configured to provide diffraction peaks for pixels within the pixilated display device.

BRIEF DESCRIPTION OF THE DRAWINGS

FIG. 3A is a schematic cross-sectional view of a variation of the virtual reality headset of FIG. 2.

FIG. 4E is a perspective view of a fifth embodiment of the diffraction element of the present disclosure.

DETAILED DESCRIPTION

Figure 1:
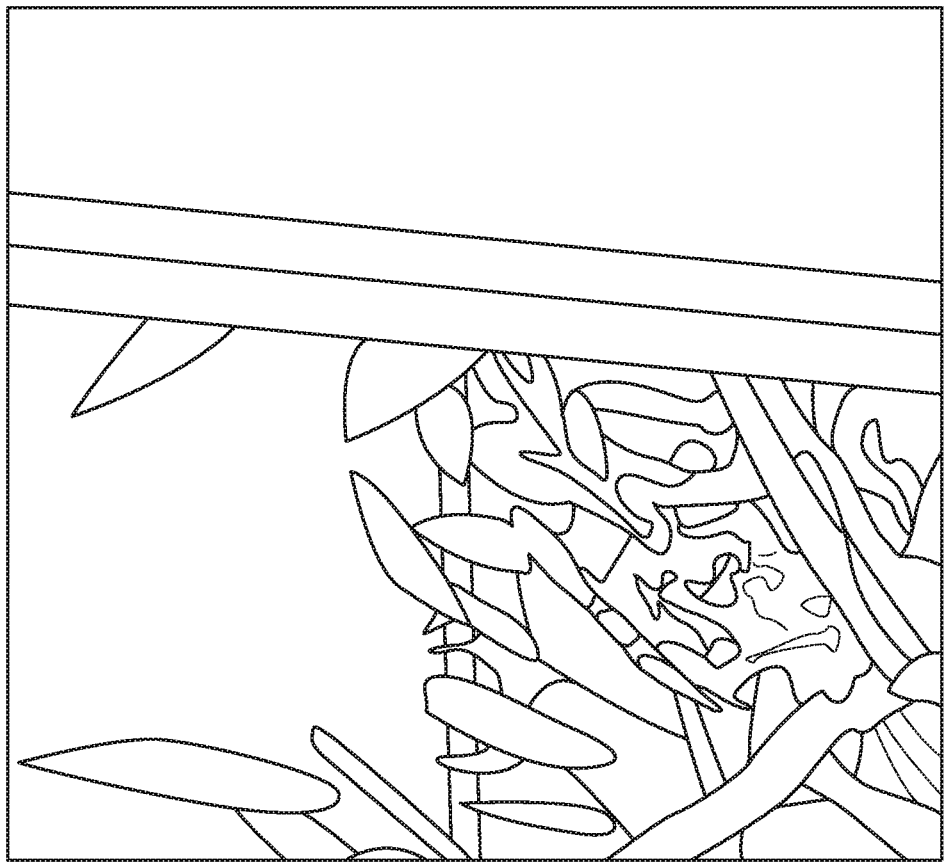
FIG. 1 is an illustration of the screen door effect. The left side image of FIG. 1 display the screen door effect in which each pixel is surrounded by a dark region. The right side image of FIG. 1 shows an image that does not have the screen door effect, which can be obtained, for example, by employing a screen with more image pixels and a greater viewing distance.
Figure 1:
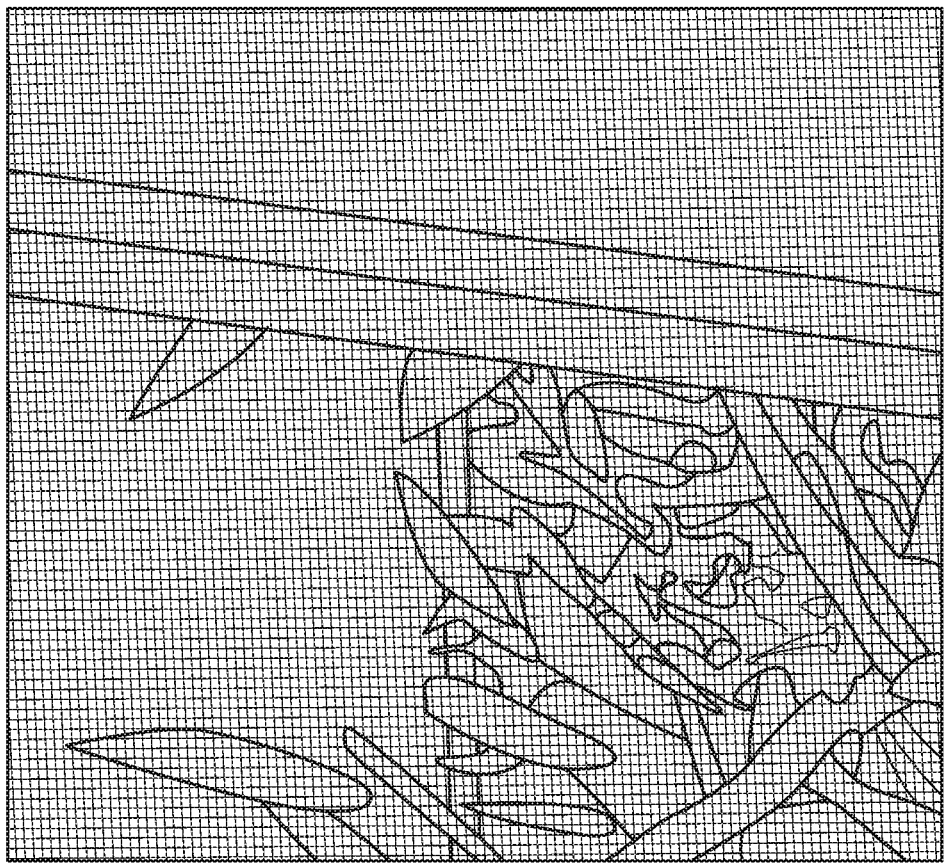

As discussed above, the present disclosure is directed to image display devices and methods of manufacturing the same, the various aspects of which are described herein in detail.

The drawings are not drawn to scale. Multiple instances of an element may be duplicated where a single instance of the element is illustrated, unless absence of duplication of elements is expressly described or clearly indicated otherwise. Ordinals such as "first," "second," and "third" are employed merely to identify similar elements, and different ordinals may be employed across the specification and the claims of the instant disclosure without limitation. As used herein, a first element located "on" a second element can be located on an exterior side of a surface of the second element or on an interior side of the second element. As used herein, a first element is located "directly on" a second element if there exists a physical contact between a surface of the first element and a surface of the second element.

As used herein, a "layer" refers to a material portion including a region having a substantially uniform thickness. A layer may extend over the entirety of an underlying or overlying structure, or may have an extent less than the extent of an underlying or overlying structure. Further, a layer may be a region of a homogeneous or inhomogeneous contiguous structure that has a thickness less than the thickness of the contiguous structure. For example, a layer may be located between any pair of horizontal planes between, or at, a top surface and a bottom surface of the contiguous structure. A layer may extend horizontally, vertically, and/or along a tapered surface. A substrate may be a layer, may include one or more layers therein, or may have one or more layer thereupon, thereabove, and/or therebelow.

Many virtual reality (VR) units include an optical headset that provides images on a closely placed screen (such as a high-resolution smart phone screen) to provide a large field of view experience. A prevalent problem with this approach is that the limited resolution of the smart phone screen was intended to subtend an angle of about 18°×10° with 1920× 1080 pixels. As used herein, a "pixel" refers to a unit illumination element including at least one light emitting element and is repeated in an array pattern to provide an image. For a color display device, a pixel includes at least three light emitting elements provided as a set of a red light emitting element, a green light emitting element, and a blue light emitting element. Each light emitting element that provides light emission of a single color is herein referred to as a "subpixel." Each pixel includes at least one subpixel, and typically includes three subpixels. Typically, each type of subpixels (such as red subpixels, green subpixels, or blue subpixels) forms a two-dimensional periodic array. In the VR headset, the same number of pixels is spread over 90° in order to give a pseudo-panoramic field of view. Furthermore, each eye sees only half of the pixels in order to send different images to each eye. This is typically done by splitting the screen in half.

The end result is that in current VR headsets, the individual pixels are very easily resolved leading to an effect called the "screen door effect." Referring to FIG. 1, the screen door effect is graphically illustrated in an image shown on the left side, which includes a dark two-dimensional grid of areas in which subpixels are absent. An image without the screen door effect is illustrated on the right side for comparison in FIG. 1. In case the screen door effect is present, the black lines can be visible between subpixels, which may include red subpixels, green subpixels, and blue subpixels. The screen door effect distracts users of the VR headsets from immersion into the experience that the VR headsets are supposed to provide. To avoid the distraction caused by the screen door effects, VR designers look up to higher resolution displays such as the Samsung Quad HD Super AMOLED screen with 2,560×1,440 pixels which may diminish the screen door effect. However, it is expected that the VR designers will push the field of view even wider, which requires ever higher resolution. Some even suggest that each eye will require a screen having a resolution of approximately 1,500 pixels per inch. This approach adds cost and requires greatly increased computational power to drive the high-resolution screen at the required frame rate. Current mobile devices do not yet have the required resolution or computational power to perform adequately.

While some users report that they learn to ignore the screen-door effect, the screen door effect can be very distracting to many VR users because the eyes are drawn to the high-frequency content (e.g., a dark grid pattern) in the perceived image. The screen-door features are typically the highest frequency content, and this is one of the reasons why the screen door effect can be very distracting. One of the benefits of embodiments of the present disclosure is to lower the high frequency content coming from the magnified pixels, and to effectively smooth out the pixel boundaries. This will inevitably lead to some loss in resolution and may impact sub-pixel rendering techniques.

According to an aspect of the present disclosure, the screen door effect of a surface display device in an application that requires a higher pixel density than the pixel density of the surface display device can be removed or eliminated. Specifically, the dark regions between pixels can be eliminated or reduced to improve the viewing experience. According to an aspect of the present disclosure, the removal of the screen door effect can be achieved without imposing a higher resolution requirement on the surface display unit.

Figure 2:
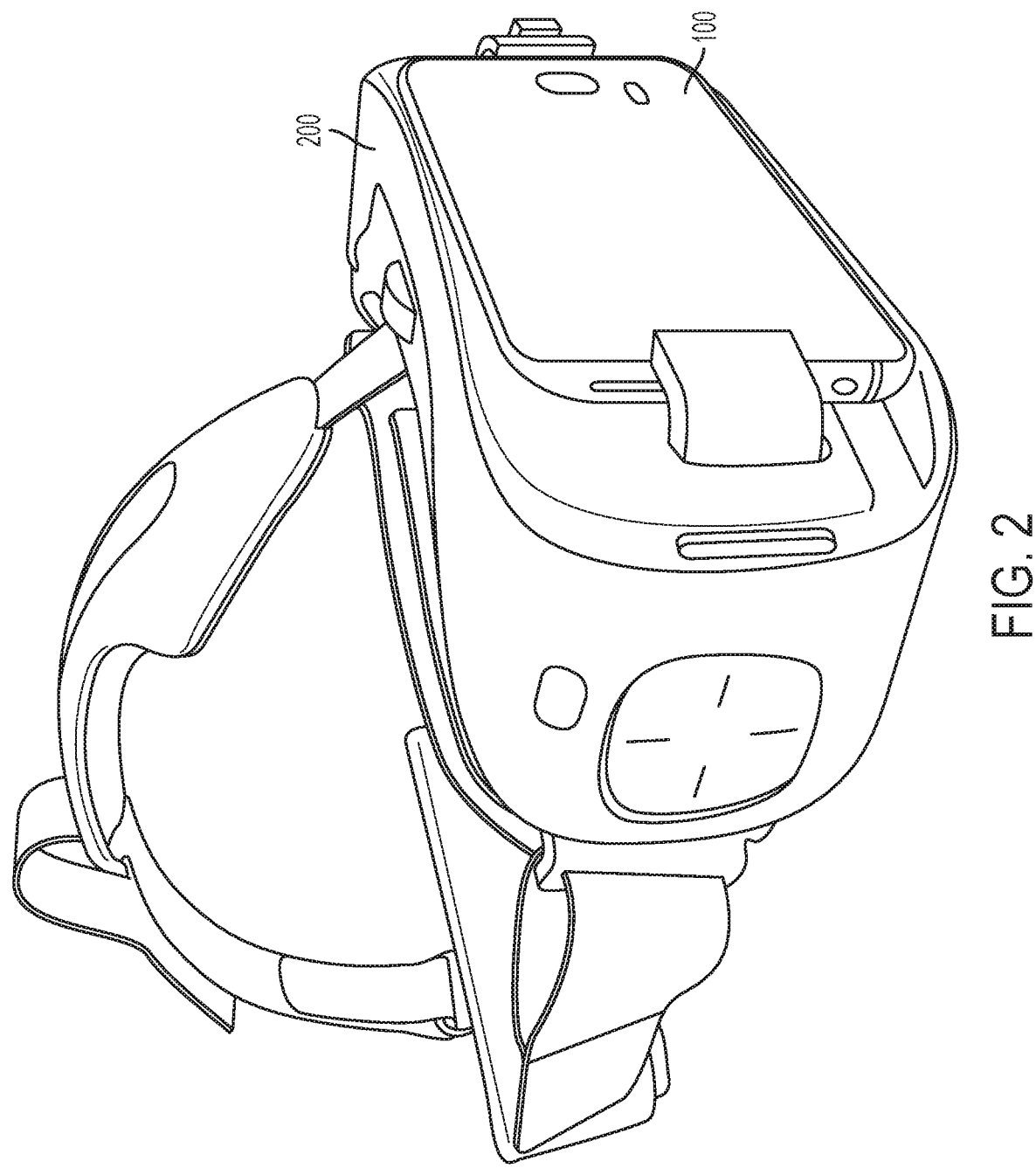
FIG. 2 is a perspective view of a virtual reality headset employing a combination of a pixilated display device and a diffraction element according to an embodiment of the present disclosure.
Figure 3B:
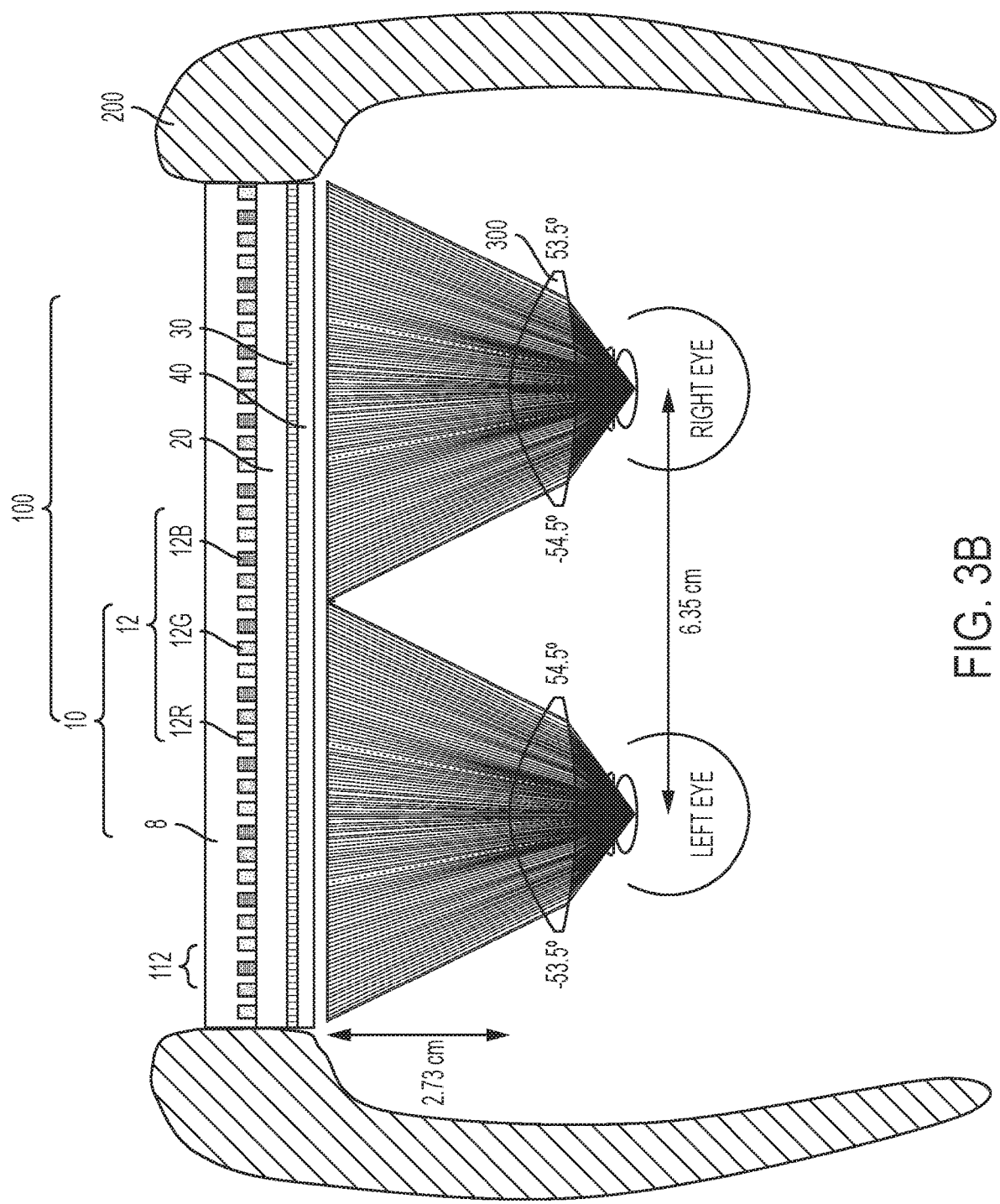
FIG. 3B is a schematic cross-sectional view of a variation of the virtual reality headset of FIG. 2.

According to an aspect of the present disclosure, a surface display unit is provided that reduces or eliminates the screen door effect. As used herein, a "surface display unit" refers to a unit that is configured to display an image on a surface, which may be a planar surface or a curved surface. Referring to FIGS. 2 and 3A, a virtual reality headset according to an embodiment of the present disclosure is illustrated. FIG. 3B illustrates a variation of the virtual reality headset of FIGS. 2 and 3A, which is derived from the virtual reality headset of FIGS. 2 and 3A by adding a transparent glossy material layer 40. The virtual reality headset is an illustrative example of a surface display unit. The virtual reality headset comprises a head set frame 200 and an assembly 100 of a pixilated display device 10, at least one transparent material layer 20, and a diffraction element 30. As used herein, a "pixilated display device" refers to a display device that employs an array of pixels to form an image. As used herein, a "transparent material layer" refers to a layer of a material that is optically transparent in the visible wavelength range, i.e., a range from 400 nm to 800 nm. A transparent material layer may be a transparent solid layer, a transparent liquid layer, or a transparent gas layer (i.e. a volume of gas such as air). In one embodiment, the at least one transparent material layer can include an air gap, i.e., a volume of air. As used herein, a "diffraction element" refers to an element that provides diffraction of light within the visible wavelength range. While a virtual display headset is employed as an illustrative example of a surface display unit, the device of the present disclosure can be formed in any surface display unit, which may, or may not, be a virtual reality headset.

In one embodiment, the pixilated display device 10 can includes a two-dimensional array of pixels 112. Each pixel 112 includes a set of at least one subpixel 12. In a monochromatic surface display device, each pixel 112 may consist of a single subpixel 12. In a color display, each pixel 112 can include a plurality of subpixels 12 of different types, which may be, for example, a first subpixel 12R that emits light at a first wavelength, a second subpixel 12G that emits light at a second wavelength, and a third subpixel 12B that emits light at a third wavelength. Each wavelength can be different. In an illustrative example, the first subpixel 12R can emit a red light, the second subpixel 12G can emit a green light, and the third subpixel 12B can emit a blue light. The surface display device 10 may be any display device that forms an image directly on the surface of the display device. In one embodiment, the surface display device 10 may be an organic light-emitting diode (OLED) display device or a liquid crystal display (LCD) device. A substrate 8 can be located on the plurality of subpixels, which may provide mechanical support and electrical connections to the plurality of subpixels 12. The substrate 8 may be an opaque substrate. The selective wavelengths can be emitted directly through optical emission (such as in OLED displays) or emitted by filtering broadband light using optical filters or color-conversion technologies including but not limited to dyes or quantum dots.

In one embodiment, the two-dimensional array of pixels 112 can include at least one periodic array of subpixels 12 that emit light at a same peak wavelength and having a subpixel pitch. The direction and the distance of the subpixel pitch for each periodic array of subpixels 12 defines the periodicity of the respective array of subpixels 12.

In one embodiment, the two-dimensional array of pixels 112 includes a plurality of periodic arrays of subpixels 12. Each set of subpixels of the same type can form a periodic array of subpixels such that each periodic array has the same periodicity as the periodicity of the pixels 12. Subpixels 12 in different periodic arrays can emit light at different peak wavelengths. For example, the set of first subpixels 12R that emit light at the first wavelength can form a first periodic array of subpixels 12R, the set of second subpixels 12G that emit light at the second wavelength can form a second periodic array of subpixels 12G, and the set of third subpixels 12B that emit light at the third wavelength can form a third periodic array of subpixels 12B. The first, second, and third periodic array of subpixels can have the same two-dimensional periodicity, which is the periodicity of the array of pixels 12. The geometries of the individual first, second or third subpixels need not be the same and may be chosen to provide the correct color balance for the display.

It is understood that the periodicity of any periodic array may be determined locally, and that the periodicity of any array may gradually change from region to region. For example, the pixilated display device 10 may have a more dense array in a first region (e.g., a center region corresponding to a high sensitivity view for human eyes) and a less dense region in a second region (e.g., a peripheral region corresponding to a low sensitivity view for human eyes). In this case, the pixilated display device 10 may have shorter pitches for the subpixels (12R, 12G, 12B) in the first region, and may have longer pitches for the subpixels (12R, 12G, 12B) in the second region. It is also understood that the geometries of the subpixels may be determined locally, and that the geometry of any subpixel may gradually change from region to region.

In one embodiment, the at least one periodic array of subpixels 12 can include a periodic array of red subpixels (which can be embodied as the first subpixels 12R), a periodic array of green pixels (which can be embodied as the second subpixels 12G), and a periodic array of blue pixels (which can be embodied as the third subpixels 12B).

In one embodiment, the pixilated display device 10 and the two-dimensional array of pixels 112 therein can provide a curved viewing surface to provide enhanced viewing experience, for example, as in the case of a virtual reality headset. In this case, all or some of the additional components within the assembly 10 may have curved surfaces to optimize the viewing experience.

The at least one transparent material layer 20 is located between the pixilated display device 10 and the diffraction element 30. The at least one transparent material layer 20 may include a single transparent material layer, or may include a plurality of transparent material layers. Each layer in the at least one transparent material layer 20 can include any transparent material such as silicon dioxide, glass, sapphire, a transparent plastic material, or an organic or inorganic transparent polymer. The at least one transparent material layer 20 can have a uniform thickness throughout. In case the pixilated display device 10 is contoured, the at least one transparent material layer 20 can conformally follow the contour of the pixilated display device 10. The thickness of the at least one transparent material layer 20 can be from 50 microns to 1 mm, and/or from 100 microns to 800 microns, and/or from 200 microns to 600 microns, although lesser and greater thicknesses can also be employed.

The diffraction element 30 is located over the at least one transparent material layer 20, and is configured to provide diffraction peaks for pixels 112 within the pixilated display device 112.

In one embodiment illustrated in FIG. 3A, the diffraction element 30 can have a solid-to-ambient interface at a front surface that is distal from the pixilated display device 10. As used herein, a "solid-to-ambient interface" refers to an interface between a solid material and an ambient gaseous material, which may be air. In this case, the solid material is provided by the material of the diffraction element 30, which can include, for example, glass, sapphire, a plastic material, and/or a polymer material.

In one embodiment illustrated in FIG. 3B, the transparent glossy material layer 40 can be disposed on the front surface of the diffraction element 30. In this case, the diffraction element 30 can have an interface with a transparent glossy material layer at the front surface that is distal from the pixilated display device 10.

As used herein, a "glossy" refers to the property of having smooth front and back surfaces each with total root mean square (rms) roughness less than 20 nm and having a distinctness of image gloss DOI greater than 90%. As used herein, the term "distinctness of image" is defined by method A of ASTM procedure D57 67 (ASTM 5767), entitled "Standard Test Methods for Instrumental Measurements of Distinctness-of-Image Gloss of Coating Surfaces," the contents of which are incorporated herein by reference in their entirety. In accordance with method A of ASTM 5767, transparent material reflectance factor measurements are made on the at least one roughened surface of the transparent material sheet at the specular viewing angle and at an angle slightly off the specular viewing angle. The values obtained from these measurements are combined to provide a DOI value. In particular, DOI is calculated according to the equation:

$$DOI = [1 - Ros/Rs] \times 100,$$

where Ros is the relative reflection intensity average between 0.2° and 0.4 away from the specular reflection direction, and Rs is the relative reflection intensity average in the specular direction (between +0.05° and −0.05°, centered around the specular reflection direction). If the input light source angle is +20° from the sample surface normal (as it is throughout this disclosure), and the surface normal to the sample is taken as 0°, then the measurement of specular reflected light Rs is taken as an average in the range of about −19.95° to −20.05°, and Ros is taken as the average reflected intensity in the range of about −20.2° to −20.4° (or from −19.6° to −19.8°, or an average of both of these two ranges). As used herein, DOI values should be directly interpreted as specifying a target ratio of Ros/Rs as defined herein. In some embodiments, the transparent glass sheet glass sheet 200 has a reflected scattering profile such that >95% of the reflected optical power is contained within a cone of ±10, where the cone is centered around the specular reflection direction for any input angle.

As used herein, an "interface with a transparent glossy material layer" refers to an interface between a solid material and a transparent glossy material, i.e., a material that is transparent and glossy. In this case, the solid material is provided by the material of the diffraction element 30, which can include, for example, glass, sapphire, a plastic material, and/or a polymer material. The transparent glossy material is provided by the transparent glossy material layer 40, which can include, for example, borosilicate glass with planar surfaces or any homogeneous glass material without any embedded light-scattering material.

For any of the embodiments described herein, the diffraction element 30 may be an element that is physically distinct from the at least one transparent material layer 20, or can be a surface portion of the at least one transparent material layer 20. If the diffraction element 30 is a surface portion of the at least one transparent material layer 20, the at least one transparent material layer 20 may be provided as a patterned layer, or can be formed as at least one planar material layer can be subsequently patterned into a patterned layer.

In case the surface display device is a virtual reality headset, the assembly 100 may be mounted on the head set frame 200 to provide a glare-free enclosure defined by the virtual reality headset and an operator of the virtual display headset. As used herein, a "glare-free enclosure" refers to an enclosure in which an ambient light source is not present. Specifically, the only source of illumination within the enclosure defined by the virtual reality headset and an operator of the virtual display headset can be the illumination by the pixels 112 of the pixilated display device 10.

In one embodiment, the diffraction element 30 can have a solid-to-solid interface at a backside surface that contacts a surface of the at least one transparent material layer 20. As used herein, a "solid-to-solid interface" refers to an interface at which a first solid material physically contacts a second solid material. The solid-to-solid interface can be a single continuous interface, or can be a set of discrete contact regions that may, or may not, be adjoined to one another.

Referring to FIGS. 4A-4D, exemplary diffraction elements 30 are illustrated. Each diffraction element 30 comprises a patterned transparent material layer having a thickness modulation. In one embodiment, the diffraction element 30 can comprise at least one of a one-dimensional diffraction grating, a stack of at least two one-dimensional diffraction gratings, and a two-dimensional diffraction grating. In one embodiment, the diffraction element 30 can be a one-dimensional diffraction grating, a two-dimensional diffraction grating, or a stack of at least two one-dimensional diffraction gratings. In one embodiment, the diffraction element 30 can have a periodic thickness modulation between the front surface and the backside surface along at least one direction that is perpendicular to the direction of the thickness of the diffraction element 30. The at least one direction may be a single direction, or two different directions.

Figure 4A:
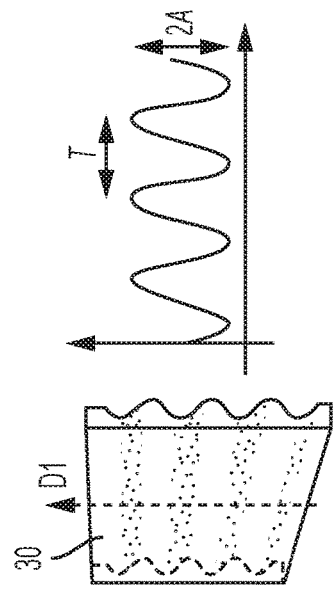
FIG. 4A is a perspective view of a first embodiment of the diffraction element of the present disclosure.
Figure 4B:
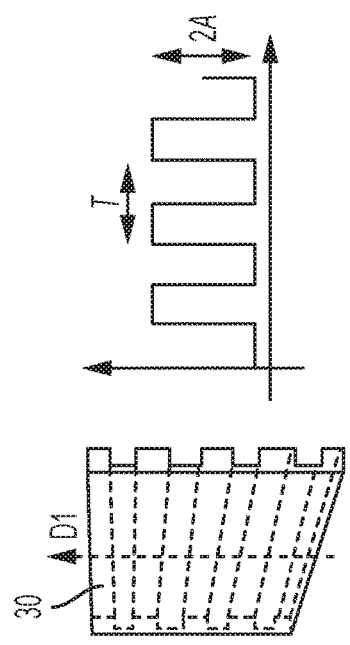
FIG. 4B is a perspective view of a second embodiment of the diffraction element of the present disclosure.

In one embodiment, the diffraction element 30 can comprise a single material layer having a first surface modulation in the front surface that extends along a first direction D1 as illustrated in FIGS. 4A and 4B. The thickness modulation along the first direction D1 may be a square wave type as illustrated in FIG. 4A, or may be a sinusoidal type as illustrated in FIG. 4B. The periodicity T of the thickness modulation and the range 2A of the thickness modulation are illustrated in FIGS. 4A and 4B.

Figure 4C:
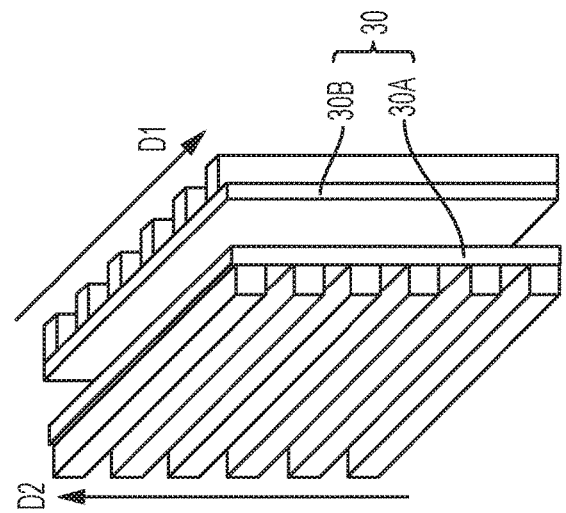
FIG. 4C is a perspective view of a third embodiment of the diffraction element of the present disclosure.

In one embodiment, the diffraction element 30 can comprise a single material layer having a first surface modulation in the front surface that extends along a first direction D1, and having a second surface modulation in a backside surface that extends along a second direction D2 that is different from the first direction D1 as illustrated in FIG. 4C.

Figure 4D:
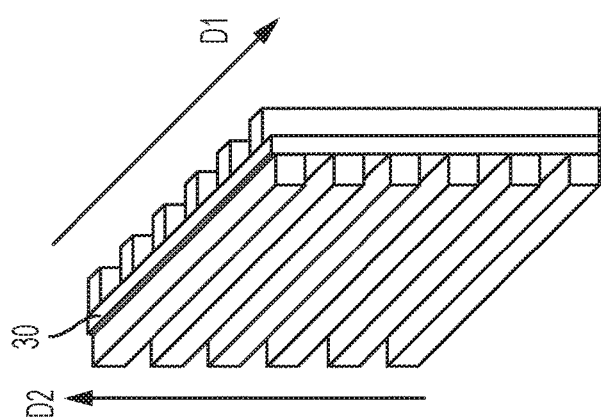
FIG. 4D is a perspective view of a fourth embodiment of the diffraction element of the present disclosure.

In one embodiment, the diffraction element 30 can comprise a vertical stack of two one-dimensional diffraction gratings (30A, 30B) that diffract light along different directions as illustrated in FIG. 4D.

At least one surface selected from the front surface of the diffraction element 30 and a backside surface of the diffraction element 30 can have a periodic height variation having a range 2A from 0.25 microns to 1 micron. In one embodiment, only one surface selected from the front surface of the diffraction element 30 and the backside surface of the diffraction element 30 can have a periodic one-dimensional or two-dimensional height variation having a range 2A from 0.25 microns to 1 micron. In another embodiment, both the front surface of the diffraction element 30 and the backside surface of the diffraction element 30 can have a periodic one-dimensional or two-dimensional height variation having a range 2A from 0.25 microns to 1 micron.

Referring to FIG. 4E, the diffraction element 30 may have a refraction index modulation along at least one direction that is perpendicular to the thickness direction of the diffraction element. The thickness direction is the primary direction along which light passes through. The diffraction element 30 may include a vertical stack of two one-dimensional diffraction gratings (30A, 30B), only one one-dimensional diffraction grating (30A or 30B), or a two-dimensional diffraction grating. While the two one-dimensional diffraction gratings (30A, 30B) are illustrated in a separated position, it is understood that the two one-dimensional diffraction gratings (30A, 30B) may be disposed on each other, or may even be merged to form a two-dimensional diffraction grating. The refraction index modulation can be provided by introducing dopant materials to locally alter the refractive index of a matrix material. The portions of the matrix material having the original refractive index constitute first refractive index regions 31 having a first refractive index, and the portions of the matrix material including the dopant atoms constitute second refractive index regions 32. The first refractive index regions 31 and the second refractive index regions 32 may be interlaced in a one-dimensional periodic array, or in a two-dimensional periodic array.

Figure 5A:
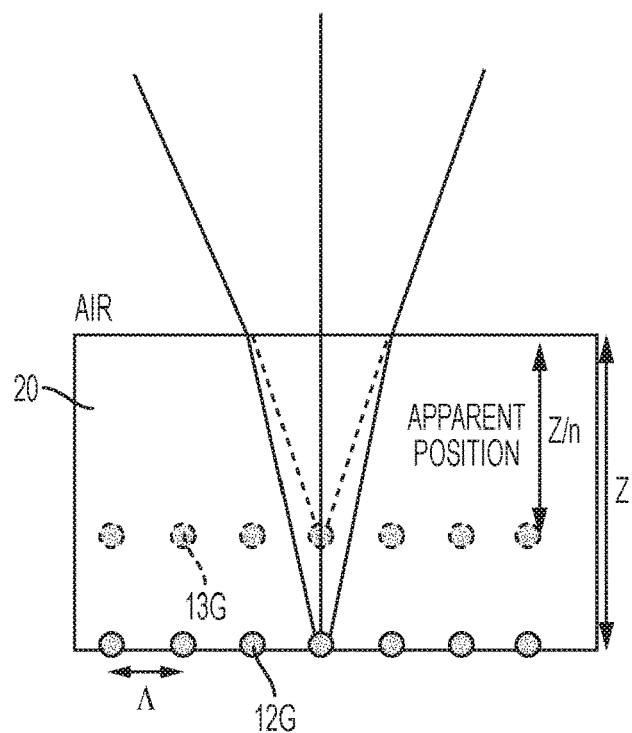
FIG. 5A is a schematic illustration of optics in a comparative exemplary device in which a diffraction grating is not employed.
Figure 5B:
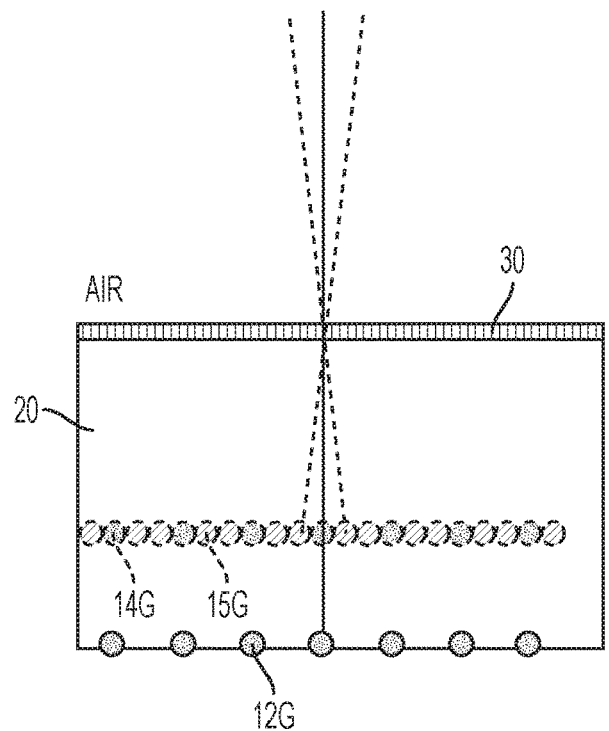
FIG. 5B is a schematic illustration of optics in an exemplary device of the present disclosure.

In each of the above embodiments, the diffraction element 30 can be configured to provide diffraction peaks for the at least one periodic array of subpixels 12. In an illustrative example, the diffraction element 30 can have a periodicity T in a range from 2 microns to 20 microns. The diffraction peaks appear at locations laterally offset from respective subpixels 12 by a distance less than a respective subpixel pitch. FIGS. 5A and 5B illustrate the mechanism for generation of the diffraction peaks though the diffraction element 30.

It is understood that the periodicity of the diffraction element 30 may be determined locally, and that the periodicity of the diffraction element 30 may gradually change from region to region. Thus, the periodicity of the diffraction element may have a variation within the field of view to accommodate a combination of optimal viewing and optimal manufacturing cost. If the diffraction element 30 is curved, the periodicity of the diffraction element 30 may be locally determined, and may vary in directions and/or in distance across the field of view.

Referring to FIG. 5A, optics in a comparative exemplary device is illustrated in which a diffraction grating is not employed over the at least one transparent material layer 20. For illustrative purposes, only second subpixels 12G are illustrated, and first subpixels 12R and third subpixels 12B are not illustrated. For simplicity, the at least one transparent material layer 20 is illustrated as a single transparent material layer having a refractive index n and a thickness Z. In this case, the optical thickness of the at least one transparent material layer 20 is given by Z/n. In case the at least one transparent material layer 20 is given by a stack of N transparent material layers each having a refractive index $n_i$ and a thickness of $Z_i$, in which i is an index running from 1 to N, the optical thickness of the at least one transparent material layer 20 is given by:

$$\sum_{i=1}^{N} Z_i / n_i.$$

The apparent positions 13G of the second subpixels 12G are located at a vertical distance of the FIG. 5A that is the same as the optical thickness of the at least one transparent material layer 20. Refraction of light at the solid-to-ambient interface is illustrated in FIG. 5A.

Referring to FIG. 5B, optics in the combination of the diffraction element 30 and the at least one conductive material layer 20 is illustrated. The dotted lines illustrate the apparent direction of diffraction peaks 15G for the second subpixels 12G. The locations of the center peaks 14G are the same as the apparent positions 13G of the second subpixels 12G in FIG. 5A. The center peaks 14G correspond to zeroth order peak of the diffraction pattern, and the diffraction peaks 15G correspond to first order peaks of the diffraction pattern. Second order diffraction peaks (not shown) can be spaced at double the distance from a respective center peak 14G compared to the locations of the diffraction peaks 15G (which are first order diffraction peaks).

In one embodiment, the ratio of a lateral offset distance of a diffraction peak 15G to the respective subpixel pitch can be about ⅓. The lateral offset distance of a diffraction peak 15G refers to the lateral distance (within a plane parallel to the plane of the image display, or the plane of the pixilated display) between the diffraction peak 15G and the center peak 14G for which the diffraction peak 15G is the first order maximum of the diffraction pattern. The subpixel pitch is the pitch of the subpixels that provides the light source of the diffraction pattern along the direction connecting the center peak 14G and the diffraction peak 15G, e.g., the pitch of the second subpixels 12G along the direction connecting the center peak 14G and the diffraction peak 15G. In one embodiment, the ratio of a lateral offset distance of the diffraction peak 15G to the respective subpixel pitch can be in a range from 0.25 to 0.45, and/or in a range from 0.28 to 0.40, and/or in a range from 0.30 to 0.37, although lesser and greater ratios can also be employed.

Figure 6:
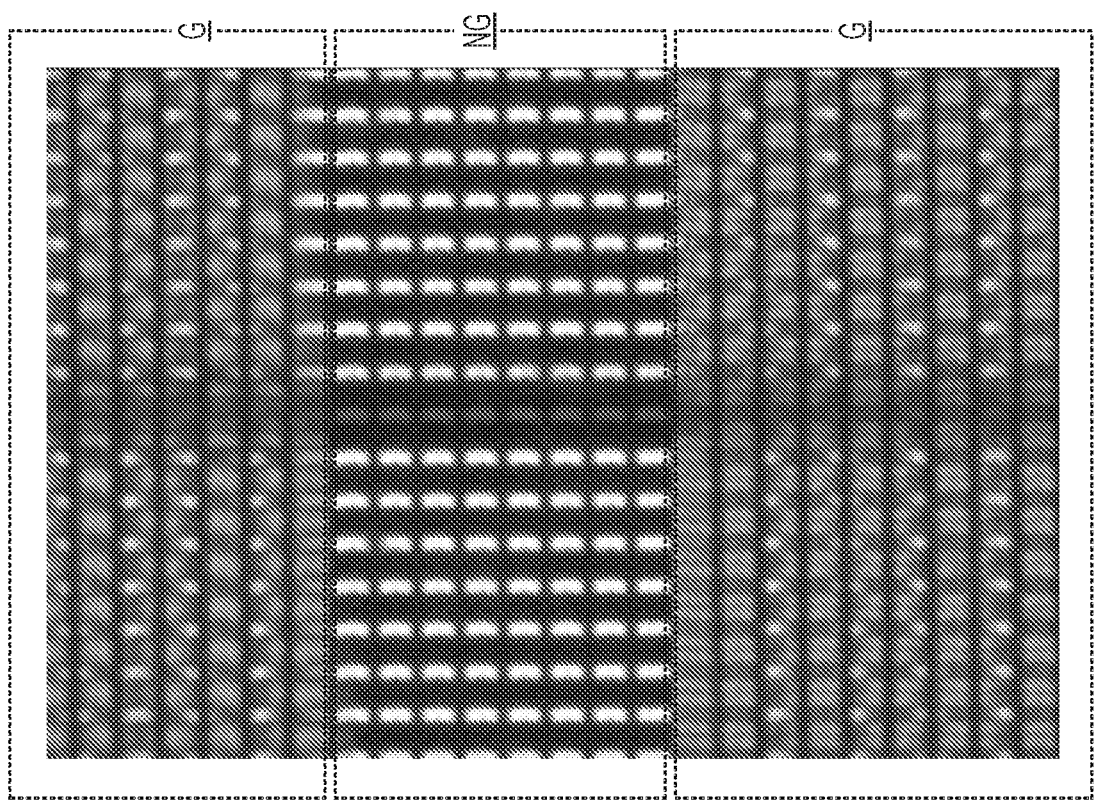
FIG. 6 is a top-down view of a monochromatic display device including two regions having diffraction elements and a region that does not have a diffraction element.

Referring to FIG. 6, a top-down view of a monochromatic display device including two regions having diffraction elements 30 and a region that does not have a diffraction element are illustrated. The two regions having diffraction elements 30 are herein referred to as diffraction grating regions G, and the region that does not have a diffraction element is herein referred to as a non-diffraction region NG. Each diffraction region G can have a configuration of FIG. 5B, and the non-diffraction region NG can have a configuration of FIG. 5A. Alleviation of the screen door effect in the diffraction regions G is clearly manifested in FIG. 6.

Figure 7A:
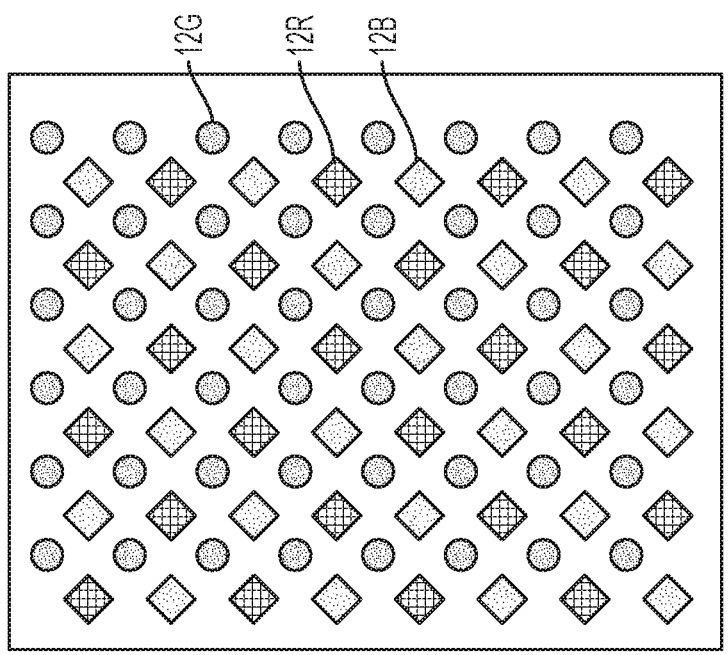
FIG. 7A is a top-down view of a three color display device having an array of pixels.

Each pixel 112 can have any configuration of subpixels 12 known in the art. Some pixel configurations contain a significant amount of dark space between the subpixels. FIG. 7A illustrates an exemplary pixel configuration employed for Samsung Super AMOLED Quad HD™.

In a typical pixel configuration, each pixel 112 includes one first subpixel 12R (i.e., a subpixel of a first type emitting light at a first wavelength such as a wavelength for red light (such as 590 nm)), two second subpixels 12G (i.e., two subpixels of a second type emitting light at a second wavelength such as a wavelength for green light (such as 530 nm)), and a third subpixel 12B (i.e., a subpixel of a third type emitting light at a third wavelength such as wavelength for blue light (such as 450 nm)). In the exemplary case of Samsung Super AMOLED Quad HD™, the first subpixels 12R are red pixels, the second subpixels 12G are green pixels, and the third subpixels 12B are blue subpixels.

Figure 7B:
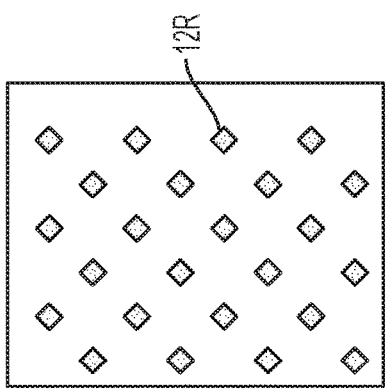
FIG. 7B is a top-down view of the three color display device of FIG. 7A when only first type subpixels emit light without a diffraction grating thereupon.
Figure 7C:
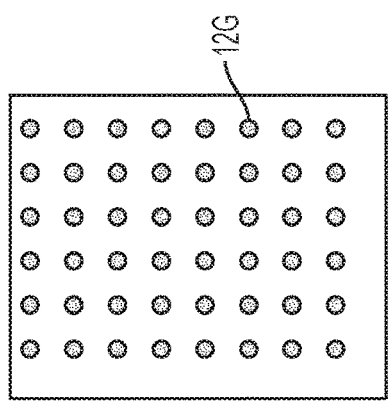
FIG. 7C is a top-down view of the three color display device of FIG. 7A when only second type subpixels emit light without a diffraction grating thereupon.
Figure 7D:
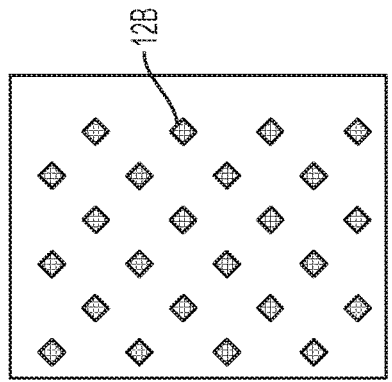
FIG. 7D is a top-down view of the three color display device of FIG. 7A when only third type subpixels emit light without a diffraction grating thereupon.

Each set of subpixels 12 of the same type provide an illumination area for the respective subpixels. Thus, the set of first subpixels 12R provide a first illumination area as illustrated in FIG. 7B, which is the sum of all areas of the first subpixels 12R. Likewise, the set of second subpixels 12G provide a second illumination area as illustrated in FIG. 7C, which is the sum of all areas of the second subpixels 12G, and the set of third subpixels 12B provide a third illumination area as illustrated in FIG. 7D, which is the sum of all areas of the third subpixels 12B.

In an illustrative example, a diffraction element 20 including a two-dimensional periodic array of optical features (such as diffraction gratings) can be employed as illustrated in FIGS. 3A and 3B to provide diffraction peaks for each type of subpixels. In an illustrative example, periodicity of the features of the diffraction grating 30 along each direction of periodicity of the array of pixels 112 can be selected based on the wavelength and periodicity of subpixels of a selected type. For example, subpixels having the smallest illumination area or subpixels having an intermediate wavelength may be selected for optimal performance. In an illustrative example, green subpixels may be selected in an RGB display because the green light has an intermediate wavelength between the red light and the blue light. In this case, the ratio of a lateral offset distance of the diffraction peak for the green subpixels to the subpixel pitch for the green subpixels can be in a range from 0.25 to 0.45, and/or in a range from 0.28 to 0.40, and/or in a range from 0.30 to 0.37, although lesser and greater ratios can also be employed. In this case, the diffraction peaks for the green subpixels can be located about ⅓ of the subpixel pitch (i.e., a nearest neighbor distance for the green subpixels).

Figure 7E:
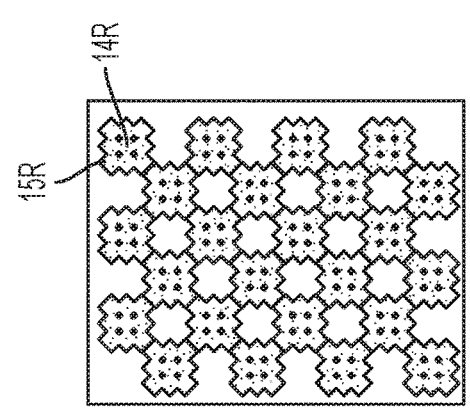
FIG. 7E is a top-down view of the three color display device of FIG. 7A when only first type subpixels emit light with a diffraction grating thereupon.
Figure 7F:
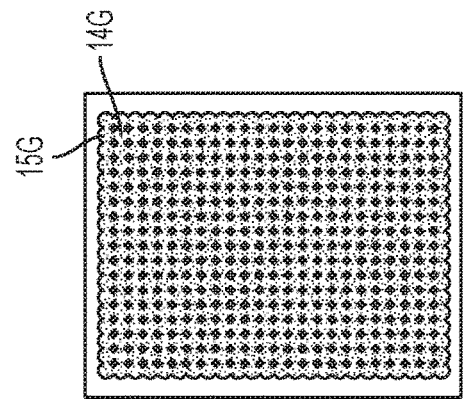
FIG. 7F is a top-down view of the three color display device of FIG. 7A when only second type subpixels emit light with a diffraction grating thereupon.
Figure 7G:
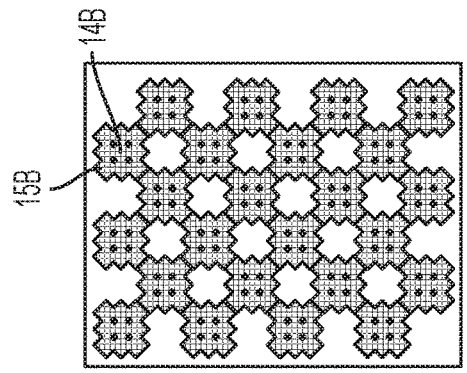
FIG. 7G is a top-down view of the three color display device of FIG. 7A when only third type subpixels emit light with a diffraction grating thereupon.

FIGS. 7E, 7F, and 7G illustrate the apparent illumination area, as determined by the area that appears to emit a significant amount of light (e.g., at an intensity that is at least 1% of the peak intensity), upon placement of a diffraction element 30 configured to produce first order diffraction peaks having a same intensity as zeroth order peaks (i.e., the center peaks). FIG. 7E illustrates the apparent illumination area as observed by a viewer for the red pixels, FIG. 7F illustrates the apparent illumination area as observed by the viewer for the green pixels, and FIG. 7G illustrates the apparent illumination area as observed by the viewer for the blue pixels.

As illustrated in FIGS. 7E, 7F, and 7G, the use of the diffraction element 30 of the present disclosure increases the apparent area of illumination in a predefined manner, i.e., employing an intensity profile that is uniquely determined for each wavelength based on the periodicity of the optical features in the diffraction element 30.

The ratio of the total lit subpixel area to dark area (as calculated when all of the subpixels of the same type are lit and all other types of subpixels are turned off) is referred to as the fill fraction of the subpixels for each type of subpixel. Different types of subpixels can have different fill ratios. Under typical viewing conditions, the eye is unable to resolve the subpixels, and the dark space vanishes visually. However, virtual reality (VR) systems contain additional lenses 300 as illustrated in FIG. 3A. The lenses 300 magnify the individual subpixels, making the dark space very apparent as illustrated in the left side picture of FIG. 1. The methods of the present disclosure eliminates, or reduces, such dark spaces by increasing the apparent illumination area (i.e., the lit area), while reducing the dark area.

The method of increasing the apparent area of illumination according to an aspect of the present disclosure is different from the technique of increasing the apparent illumination area by introducing random scattering, for example, employing a coating of a diffuser material. The diffraction element 30 of the present disclosure provides a predefined and controlled uniform light intensity distribution profile for each subpixel emitting light of the same peak wavelength, while use of a diffuser material introduces random scattering of light, resulting in randomly varied light intensity distribution profile. Thus, the method of the present disclosure can provide a sharper image than methods employing a diffuser material layer that introduces unpredictable random light scattering.

In one embodiment, one or more of the at least one periodic array of subpixels can have a total area that is less than 0.25 times the total display area of the pixilated display device 10. As used herein, the "total area" of an array of subpixels refers to the sum of all areas of the subpixels in the array. As used herein, the "total display area" of a pixilated display device refers to the area of the display region enclosed by the periphery of the array of pixels of the pixilated display device.

In one embodiment, each first order diffraction peak can have a comparable intensity as the corresponding center peak (i.e., the zeroth order peak), i.e., at least 50% of the intensity of the center peak. In one embodiment, the intensity ratio of a first order diffraction peak to a respective zeroth order diffraction peak can be in a range from 0.5 to 1.5, and/or in a range from 0.75 to 1.25, for one of the at least one periodic array of subpixels. In one embodiment, the intensity ratio of a first order diffraction peak to a respective zeroth order diffraction peak can be in a range from 0.5 to 1.5, and/or in a range from 0.75 to 1.25, for each periodic array of subpixels.

In one embodiment, only the center peak (i.e., the zeroth order peak) and the first order diffraction peaks can have significant intensities (i.e., an intensity greater than 10% of the maximum intensity of illumination for any illumination pattern centered around a center peak). In one embodiment, the intensity ratio of a second order diffraction peak to a respective zeroth order diffraction peak can be less than 0.1, and/or less than 0.05, and/or less than 0.01 for the one of the at least one periodic array of subpixels. In one embodiment, the intensity ratio of a second order diffraction peak to a respective zeroth order diffraction peak can be less than 0.1, and/or less than 0.05, and/or less than 0.01 for the each periodic array of subpixels.

In one embodiment, the surface display unit according to an embodiment of the present disclosure can be a virtual reality headset, and the pixilated display device 10 can be a head mount display configured to provide a display image within a glare-free enclosure defined by the virtual reality headset and an operator of the virtual display headset who is wearing the same. In one embodiment, the at least one transparent material layer 20 can contact the pixilated display device 10 and the diffraction element 30. In one embodiment, the two-dimensional array of pixels in the head mount display can have insufficient pixel density to remove the screen door effect. For example, the two-dimensional array of pixels in the head mount display can have a resolution in a range from 200 pixels per inch to 2,500 pixels per inch, which may be insufficient or marginal for the purpose of eliminating the screen door effect in the absence of the diffraction element 30. In this case, the presence of the diffraction element 30 on the at least one transparent material layer 20 can fully or partially eliminate the screen door effect.

In one embodiment, a surface display unit of the present disclosure can be formed by providing a head set frame 200, providing an assembly 100 of the pixilated display device 10, the at least one transparent material layer 20, and the diffraction element 30, and mounting the assembly 100 to the head set frame 200. As discussed above, the diffraction element 30 can have a solid-to-ambient interface at a front surface that is distal from the pixilated display device 10.

In one embodiment, the two-dimensional array of pixels comprises a plurality of periodic arrays of subpixels such that subpixels in different periodic arrays emit light at different peak wavelengths, and the diffraction element can comprise at least one of a one-dimensional diffraction grating, a stack of two one-dimensional diffraction gratings, and a two-dimensional diffraction grating.

Additionally or alternatively, the two-dimensional array of pixels may comprise at least one periodic array of subpixels that emit light at a same peak wavelength and having a subpixel pitch; the diffraction element may be configured to provide diffraction peaks for the at least one periodic array of subpixels at locations laterally offset from respective subpixels by a distance less than a respective subpixel pitch; a ratio of a lateral offset distance of a diffraction peak to the respective subpixel pitch may be in a range from 0.25 to 0.45; the at least one periodic array of subpixels may comprise a periodic array of red subpixels, a periodic array of green pixels, and a periodic array of blue pixels; one of the at least one periodic array of subpixels may have a total area that is less than 0.25 times a total display area of the pixilated display device; an intensity ratio of a first order diffraction peak to a respective zeroth order diffraction peak may be in a range from 0.5 to 1.5 for one of the at least one periodic array of subpixels; and/or an intensity ratio of a second order diffraction peak to a respective zeroth order diffraction peak may be less than 0.1 for the one of the at least one periodic array of subpixels.

Additionally or alternatively, the at least one transparent material layer may have a thickness in a range from 50 microns to 1 mm; the diffraction element may have a periodicity in a range from 2 microns to 20 microns; a surface selected from the front surface of the diffraction element and a backside surface of the diffraction element may have a periodic height variation having a range from 0.25 microns to 1 micron; and the two-dimensional array of pixels may have a resolution in a range from 200 pixels per inch to 2,500 pixels per inch.

The discussion below further describes the principles and non-limiting illustrative examples of designing the diffraction element 30 of the present disclosure. Notwithstanding the discussion below, the devices and methods of the present disclosure may be employed in any manner consistent with the description above because the description below is provided only for description of general principles of operation of the disclosed devices and exemplary applications, and does not limit the scope of the present disclosure.

Basic Grating Design:

The ideal approach to eliminating the dark area is to slightly enlarge each pixel individually while leaving the pixel pitch constant. This might seem impossible, but a carefully designed diffracting transmission grating will perform exactly the desired operation. The discussion of profiles of square and sinusoidal diffraction gratings for transmission is herein limited to those illustrated in FIG. 4A or 4B for the sake of simplicity. The gratings of FIGS. 4A and 4B are also referred to as phase gratings. For a square grating, the optical phase is given by:

$$\phi(x) = \phi_0 + \Delta\phi \cdot rect\left(\frac{2\pi x}{T}\right) = \phi_0 + \frac{2\pi}{\lambda}\Delta n \cdot A \cdot rect\left(\frac{2\pi x}{T}\right)$$

where T is the period, $\Delta n$ is the index contrast on either side of the surface, $\lambda$ is the wavelength and A is a physical amplitude factor. The diffraction efficiency DE for the various diffraction orders m, is given by:

$$DE_{m=0} = \cos^2(\Delta\phi)$$

$$DE_{m=\pm 1} = \left(\frac{2}{\pi}\right)^2 \sin^2(\Delta\phi)$$

$$DE_{m=even} = 0$$

$$DE_{m=odd} = \left(\frac{1}{m}\right)^2 DE_{+1}$$

Ideally, the diffraction grating would have approximately equal diffraction efficiencies in the m=0 and m=±1 orders, although this is not strictly necessary to remove the screen door effect. If equality is assumed, then the following condition is required:

$$\tan(\Delta\phi) = \pm\pi/2$$

The first solution to this is $\Delta\phi \sim 1.0$ but there are a series of solutions for $\Delta\phi$. This leads to about 87.6% of the light in the central orders and 12.4% in higher diffraction orders. The light in higher orders will lead to unwanted pixel blurring.

For sinusoidal gratings, the phase and diffraction efficiencies are given by:

$$\phi(x) = \phi_0 + \Delta\phi \cdot \sin\left(\frac{2\pi x}{T}\right) = \phi_0 + \frac{2\pi}{\lambda}\Delta n \cdot A \cdot \sin\left(\frac{2\pi x}{T}\right)$$

$$DE_{m=0} = J_0^2(\Delta\phi)$$

$$DE_{m=\pm 1} = J_1^2(\Delta\phi)$$

where $J_0$ and $J_1$ are Bessel functions of the first kind. Now m=0 and m=±1 are equal when $\Delta\phi \sim 1.43$ and for a series of other values found when $|J_0(\Delta\phi)|=|J_1(\Delta\phi)|$. For the sinusoidal transmission gratings ~90% of the light will be in the m=0 and m=±1 orders.

For normal angle of incidence the diffraction angle $\theta_m$ of order m is given by:

$$\sin(\theta_m) = \frac{m\lambda}{T}$$

To obtain a lateral pixel shift of dx with a grating that is a distance Z from the pixels, it is required that:

$$\tan(\theta_m) = \frac{dx}{Z/n}$$

where n is the refractive index of the material between the grating and the pixels. For normal incidence and small $\theta_m$, the required grating period is given by:

$$T = \frac{m\lambda Z}{ndx}$$

For |m|=1, the following condition is obtained:

$$T = \frac{\lambda Z}{ndx}$$

In this case, dx would be chosen to eliminate the dark space between pixels. A suitable choice might be dx=Λ/3 where Λ is the full pixel pitch.

For high resolution displays, the glass substrate for the grating might need to be relatively thick in order to get a pitch that is easily manufactured. For example, for a wavelength of 0.530 microns, Z=100 microns, n=1.5 and dx=44/3 microns, the grating period is only 2.4 microns. This could require optical lithography and could be expensive. If the substrate is increased to Z=500 microns the pitch will increase to 12 microns and the grating could be fabricated with a wider variety of techniques including diamond turning and micro-replication.

Wavelength Dependence:

Although the equations depend on wavelength, the photopic response of the human eye is much higher in the green than in the other colors, about 70% of the brightness in a white image is created by green. As such, it is in general preferable to optimize the system parameters in green (~530 nm) and accept some degradation (slightly lower resolution) at other wavelengths.

For example, a square grating designed for 530 nm will have approximately 29% of the power in the m=0 and m=±1 orders (for a total of 87%). However, at 430 nm the m=0 and m=±1 orders would have 11% and 36% respectively (for a total of 83%) while at 630 nm they would have 44% and 23% respectively (for a total of 89%).

Angular Dependence

In a VR system the user's eyes are fixed relative to the location of the display. The display is also very close to eye and because of this proximity, pixels in the extremes of the field of view (both vertical and horizontal) may need to be viewed through a slightly modified grating. This can be understood if one notes that:
(1) Rays with a non-zero angle of incidence with the grating $\theta_i(x)$ obey a slightly more complex grating equation:

$$\sin(\theta_i(x)) + \sin(\theta_m(x)) = \frac{m\lambda}{T(x)}$$

where $\theta_i(x)$ and $\theta_m(x)$ are both defined relative to the grating normal so they have opposite signs.
(2) Rays at the extreme fields travel through a grating substrate thickness of $Z/\cos(\theta_i(x))$ $$\overline{\theta}_m = \frac{dx}{Z/(n\cos(\theta_i(x)))}$$

where $\overline{\theta}_m$ is given by $|\theta_i(x)-\theta_m(x)|$.

These two effects combine to give a spatial dependence to the grating period that may be solved using the above equations. However, the inventors have found that the angular dependence has only a small impact. This incidence angle (in the glass) could be as large as 20 degrees (assuming 30 degrees in air). Using our example (a wavelength of 0.530 microns, Z=100 microns, n=1.5 and dx=44/3 microns), the m=±1 pixel deflections would be 17.3 and 15.9 microns at 20 degrees rather than the 44/3=14.7 micron target for the Samsung OLED display. This does not seem like a significant impairment and is unlikely to need a grating-pitch correction.

An alternative solution to this problem would be an embodiment with a curved grating in front of a curved screen.

Grating Designs:

Although only one dimensional square and sinusoidal transmission gratings are specifically mentioned, it is known that other grating shapes can further improve the diffraction efficiency in desired orders. These gratings might be more difficult to fabricate, especially if it is desirable to have a thin substrate.

Although a grating with only the m=0 and m=±1 orders with dx=Λ/3 is preferable, it is possible to have a grating with m=0, m=±1, and m=±2 orders with dx=Λ/5, or even a grating with m=0, m=±1, m=±2 and m=±3 orders with dx=Λ/7. This would lead to larger grating periods T which could be easier to fabricate.

The discussion has been herein limited to only one-dimensional gratings, but the concept described here can be extended to two dimensions to eliminate the screen-door effect in both dimensions. For example, a 2D rectangular grating would be given by:

$$\phi(x, y) = \phi_0 + \Delta\phi_{xy} \cdot rect\left(\frac{2\pi x}{T_x}\right) \cdot rect\left(\frac{2\pi y}{T_y}\right)$$

Pixel patterns such as the Super AMOLED Quad HD in FIG. 7A would require a symmetric 2D diffraction grating with a 12 micron period in each dimension (assuming a 500 micron substrate with n=1.5). This would be a checkerboard-like grating pattern for a 2D rectangular grating or a square-lattice of smooth bumps for a 2D sinusoidal grating. As mentioned in the previous section, the gratings would be designed for the green wavelength and the other colors could thus have a sub-optimal grating period and amplitude.

Another embodiment would be two orthogonal 1D gratings that are placed adjacent to each other to diffract each direction separately as illustrated in FIG. 4D.

There are a wide variety of pixel geometries and fill fractions. The inventors anticipate that an appropriate 2D grating can be designed by choosing 0.530 microns as a design wavelength and orienting the grating such that the green sub-pixels are displaced appropriately. The grating periods and amplitudes in the orthogonal directions could be different in order to account for an asymmetric geometry.

The orientation of the grating must be chosen to avoid Moiré fringes resulting from the periodic nature of both the grating and the pixels. This requires precision manufacturing of the grating period and alignment must also be very precise. Moiré fringes will appear as dark bands running across the display in parallel stripes.

Periodic gratings are discussed herein, the diffraction pattern could be made of a random phase pattern whose cutoff frequency is such that the diffusion angular energy distribution is a rectangular distribution with a diffraction cone equal to the pixel size divided by the pixel to diffraction element distance. This pattern could be in one or two-dimensions and could two layered 1D gratings could be used.

The physical amplitude of the grating given by 2A in the following equation:

$$\Delta\phi = \frac{2\pi}{\lambda}\Delta n \cdot A$$

For a rectangular grating, a grating phase amplitude that produces equal intensity in the m=0 and m=±1 orders is $\Delta\phi=1$. For $\lambda=0.530$ microns and assuming a glass/air interface ($\Delta n=0.5$), the amplitude of the grating is 2A=0.338 microns. For a sinusoidal grating this would be 2A=0.480 microns.

If the grating is bonded in the display with an epoxy, there may not be a glass air interface. It is important that the refractive index of the epoxy be either higher or lower than that of the glass such that $\Delta n$ is non-zero. If $\Delta n$ is reduced to 0.1 (i.e. an epoxy of n=1.4), the new grating amplitude would be 2A=2.4 microns to achieve equal diffraction in the m=0 and m=±1 orders.

It is possible to make a volume grating that does not require surface relief. Instead A must be interpreted as an equivalent distance inside of the material over which the index has varied. For a material with a gradient index (varying in the plane of the display, varying orthogonal to the plane of the display, or varying both parallel and perpendicular to the plane of the display) an integral expression may be required to compute the optical phase accumulated through the material. In that case it is best to assume a grating phase of:

$$\phi(x) = \phi_0 + \Delta\phi \cdot rect\left(\frac{2\pi x}{T}\right)$$

$$\phi(x) = \phi_0 + \Delta\phi \cdot \sin\left(\frac{2\pi x}{T}\right)$$

Curved Substrates

Future designs for VR systems may contain curved display screens. All of the art described here can be used on curved substrates which may alleviate the need to compensate the grating for display regions that are viewed at non-normal incidence.

Manufacturing:

Low-cost diffraction gratings can be made in a variety of ways in polymer or glass materials through embossing, micro-replication, printing, laser patterning, lithography, micromachining, 3D printing, etc. The grating could be: a surface treatment on a transparent substrate; a separate film laminated to a substrate; or a volume grating in a transparent substrate. The latter embodiment could be made through an ion exchange method using an ion exchangeable glass in a high temperature salt bath.

An air gap could be incorporated on either side of the grating for improved performance. The grating can also include an antireflection coating to avoid losses due to reflection.

Future designs for VR systems may contain curved display screens. All of the art described here can be used on curved substrates.

Experimental Demonstrations:

Ion-exchanged gratings have been employed to provide enhanced view for demonstration of the inventive concept. The inventors have also used commercial phase gratings to demonstrate the inventive concept.

Although the foregoing refers to particular preferred embodiments, it will be understood that the disclosure is not so limited. It will occur to those of ordinary skill in the art that various modifications may be made to the disclosed embodiments and that such modifications are intended to be within the scope of the disclosure. Where an embodiment employing a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art.

It is also to be understood that, as used herein the terms "the," "a," or "an," mean "at least one," and should not be limited to "only one" unless explicitly indicated to the contrary. Thus, for example, reference to "a layer" includes examples having two or more layers unless the context clearly indicates otherwise. Likewise, a "plurality" or an "array" is intended to denote "more than one."

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially uniform" surface is intended to denote a surface that is uniform or approximately uniform.

Unless otherwise expressly stated, it is in no way intended that any method set forth herein be construed as requiring that its steps be performed in a specific order. Accordingly, where a method does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method that comprises A+B+C include embodiments where a method consists of A+B+C and embodiments where a method consists essentially of A+B+C.

The invention claimed is:

1. A surface display unit comprising:
    a pixilated display device including a two-dimensional array of pixels;
    at least one transparent material layer located over the pixilated display device; and
    a diffraction element located over the at least one transparent material layer and configured to provide diffraction peaks for pixels within the pixilated display device, wherein;
    the diffraction element has an interface selected from a solid-to-ambient interface and an interface with a transparent glossy material layer at a front surface that is distal from the pixilated display device;
    wherein the surface display unit is a virtual reality headset;
    the pixilated display device is a heat mount display configured to provide a display image within a glare-free enclosure defined by the virtual reality headset and an operator of the virtual reality headset;
    the two-dimensional array of pixels has a resolution in a range from 200 pixels per inch to 2,500 pixels per inch;
    a screen door effect from the two-dimensional array of pixels is visible by the operator of the virtual reality headset in the absence of the diffraction element; and
    wherein, via the presence of the diffraction element, the screen door effect is eliminated.

2. The surface display unit of claim 1, wherein the diffraction element has a refractive index modulation along at least one direction.

3. The surface display unit of claim 1, wherein:
    the two-dimensional array of pixels comprises a plurality of periodic arrays of subpixels, wherein subpixels in different periodic arrays emit light at different peak wavelengths; and
    the diffraction element comprises at least one of a one-dimensional diffraction grating, a stack of two one-dimensional gratings, and a two-dimensional diffraction grating.

4. The surface display unit of claim 1, wherein the diffraction element comprises a vertical stack of two one-dimensional diffraction gratings diffracting light along different directions.

5. The surface display unit of claim 1, wherein the diffraction element comprises a single material layer having a first surface modulation in the front surface that extends along a first direction, and having a second surface modulation in a backside surface that extends along a second direction that is different from the first direction.

6. The surface display unit of claim 1, wherein:
the at least one transparent material layer has a thickness in a range from 50 microns to 1 mm;
the diffraction element has a periodicity in a range from 2 microns to 20 microns; and
a surface selected from the front surface of the diffraction element and a backside surface of the diffraction element has a periodic height variation having a range from 0.25 microns to 1 micron.

7. The surface display unit of claim 1, wherein: the at least one transparent material layer contacts the pixelated display device and the diffraction element.

8. The surface display unit of claim 1, wherein the at least one transparent material layer comprises an air gap.

9. The surface display unit of claim 1, wherein the diffraction element has a solid-to-solid interface at a backside surface that contacts a surface of the at least one transparent material layer.

10. The surface display unit of claim 9, wherein the diffraction element has a thickness modulation between the front surface and the backside surface along at least one direction.

11. The surface display unit of claim 1, wherein:
the two-dimensional array of pixels comprises at least one periodic array of subpixels that emit light at a same peak wavelength and having a subpixel pitch; and
the diffraction element is configured to provide diffraction peaks for the at least one periodic array of subpixels, the diffraction peaks appearing at locations laterally offset from respective subpixels by a distance less than a respective subpixel pitch.

12. The surface display unit of claim 11, wherein a ratio of a lateral offset distance of a diffraction peak to the respective subpixel pitch is in a range from 0.25 to 0.45.

13. The surface display unit of claim 11, wherein:
the at least one periodic array of subpixels comprises a periodic array of red subpixels, a periodic array of green pixels, and a periodic array of blue pixels; and
one of the at least one periodic array of subpixels has a total area that is less than 0.25 times a total display area of the pixilated display device.

14. The surface display unit of claim 11, wherein:
an intensity ratio of a first order diffraction peak to a respective zeroth order diffraction peak is in a range from 0.5 to 1.5 for one of the at least one periodic array of subpixels; and
an intensity ratio of a second order diffraction peak to a respective zeroth order diffraction peak is less than 0.1 for the one of the at least one periodic array of subpixels.

15. A virtual reality headset comprising:
a head set frame; and
an assembly of a pixilated display device, at least one transparent material layer, and a diffraction element, wherein:
the assembly is mounted on the head set frame to provide a glare-free enclosure defined by the virtual reality headset and an operator of the virtual display headset;
the pixilated display device includes a two-dimensional array of pixels;
the at least one transparent material layer is located between the pixilated display device and the diffraction element;
the diffraction element is configured to provide diffraction peaks for pixels within the pixilated display device
the two-dimensional array of pixels has a resolution in a range from 200 pixels per inch to 2,500 pixels per inch;
a screen door effect from the two-dimensional array of pixels is visible by the operator of the virtual reality headset in the absence of the diffraction element; and
wherein, via the presence of the diffraction element, the screen door effect is eliminated.

16. The virtual reality headset of claim 15, wherein the diffraction element has an interface selected from a solid-to-ambient interface and an interface with a transparent glossy material layer at a front surface that is distal from the pixilated display device.

17. The virtual reality headset of claim 15, wherein:
the two-dimensional array of pixels comprises a plurality of periodic arrays of subpixels, wherein subpixels in different periodic arrays emit light at different peak wavelengths; and
the diffraction element comprises at least one of a one-dimensional diffraction grating, a stack of at least two one-dimensional diffraction gratings, and a two-dimensional diffraction grating.

18. The virtual reality headset of claim 15, wherein:
the two-dimensional array of pixels comprises at least one periodic array of subpixels that emit light at a same peak wavelength and having a subpixel pitch;
the diffraction element is configured to provide diffraction peaks for the at least one periodic array of subpixels at locations laterally offset from respective subpixels by a distance less than a respective subpixel pitch;
a ratio of a lateral offset distance of a diffraction peak to the respective subpixel pitch is in a range from 0.25 to 0.45;
the at least one periodic array of subpixels comprises a periodic array of red subpixels, a periodic array of green pixels, and a periodic array of blue pixels;
one of the at least one periodic array of subpixels has a total area that is less than 0.25 times a total display area of the pixilated display device;
an intensity ratio of a first order diffraction peak to a respective zeroth order diffraction peak is in a range from 0.5 to 1.5 for one of the at least one periodic array of subpixels; and
an intensity ratio of a second order diffraction peak to a respective zeroth order diffraction peak is less than 0.1 for the one of the at least one periodic array of subpixels.

19. The virtual reality headset of claim 15, wherein:
the at least one transparent material layer has a thickness in a range from 50 microns to 1 mm;
the diffraction element has a periodicity in a range from 2 microns to 20 microns; and
a surface selected from the front surface of the diffraction element and a backside surface of the diffraction element has a periodic height variation having a range from 0.25 microns to 1 micron.

* * * * *